United States Patent [19]

Bruno et al.

[11] Patent Number: 4,572,365
[45] Date of Patent: Feb. 25, 1986

[54] PROBE COVER HOLDING AND DISPENSING ARRANGEMENT FOR ELECTRONIC THERMOMETER

[75] Inventors: Robert H. Bruno, Avon; Robert G. Johns, Torrington; Stuart Kipperman, Easton; Geoffrey R. Mayer, Trumbull; Donald E. Protzmann, Litchfield; Robert F. Uhl, Cheshire, all of Conn.

[73] Assignee: Chesebrough-Pond's Inc., Greenwich, Conn.

[21] Appl. No.: 719,369

[22] Filed: Apr. 3, 1985

[51] Int. Cl.⁴ .................. B65D 85/08; B65D 83/02
[52] U.S. Cl. .................. 206/306; 206/443; 206/526; 374/158; 374/209; 374/183; 312/73
[58] Field of Search .............. 206/306, 443, 526; 229/7 SC; 374/158, 183, 209; 312/73

[56] References Cited

U.S. PATENT DOCUMENTS

| | | | |
|---|---|---|---|
| 1,967,204 | 7/1934 | Genz | 229/7 SC |
| 2,564,252 | 8/1951 | Dickson, Jr. | 229/7 SC |
| 3,681,991 | 8/1972 | Eberly, Jr. | 374/158 |
| 3,738,479 | 6/1973 | Sato | 374/209 |
| 4,004,692 | 1/1977 | Burns | 206/526 |
| 4,007,832 | 2/1977 | Paull et al. | 374/209 |
| 4,008,614 | 2/1977 | Turner et al. | 374/183 |

Primary Examiner—William T. Dixson, Jr.
Attorney, Agent, or Firm—Brumbaugh, Graves, Donohue & Raymond

[57] ABSTRACT

A probe cover holding and dispensing arrangement for an electronic thermometer includes a chamber in the thermometer housing to receive a carton containing the probe covers. A tear-away flap on the carton exposes some of the covers. An aperture in the chamber, closable by a sliding cover, provides access to the exposed covers.

6 Claims, 9 Drawing Figures

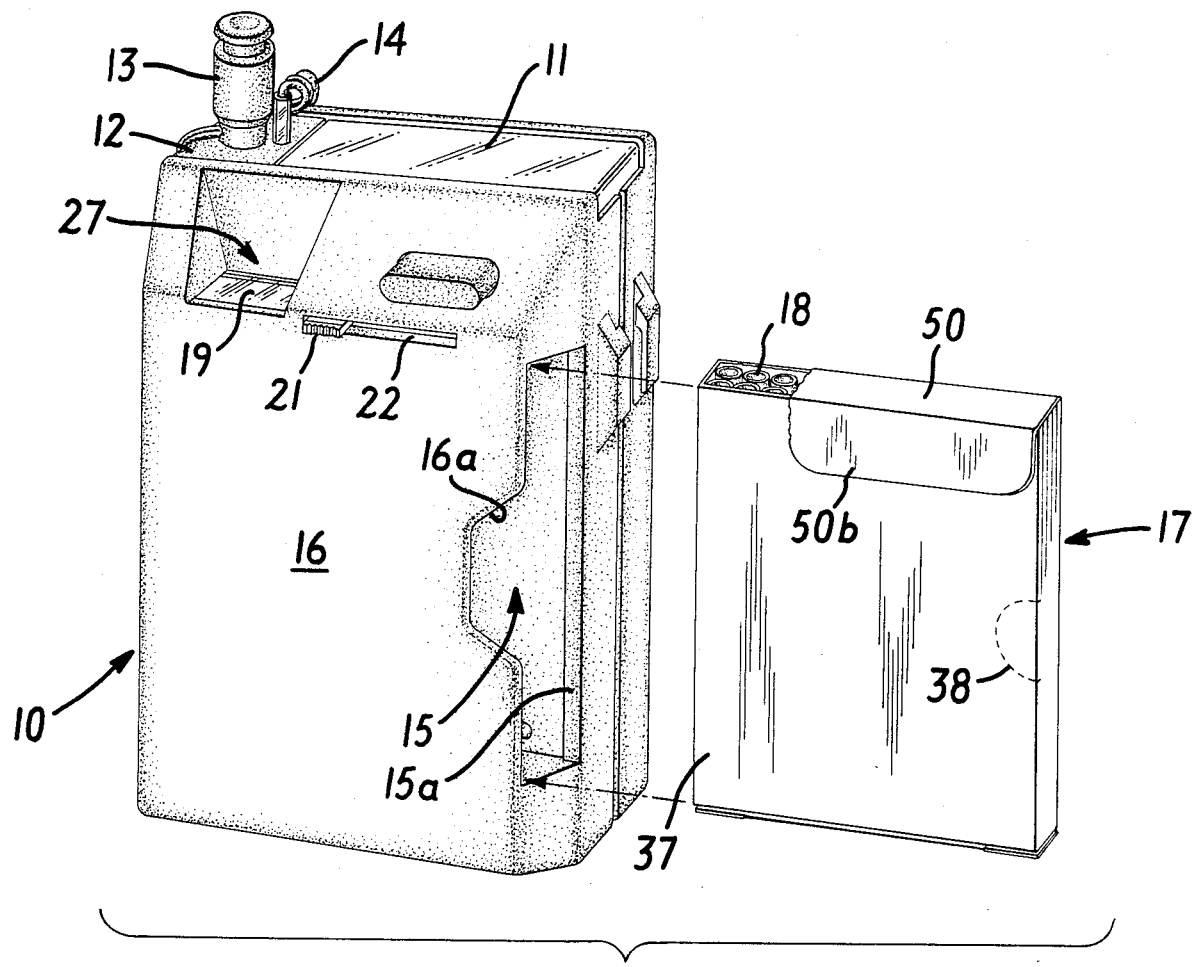
FIG. 1
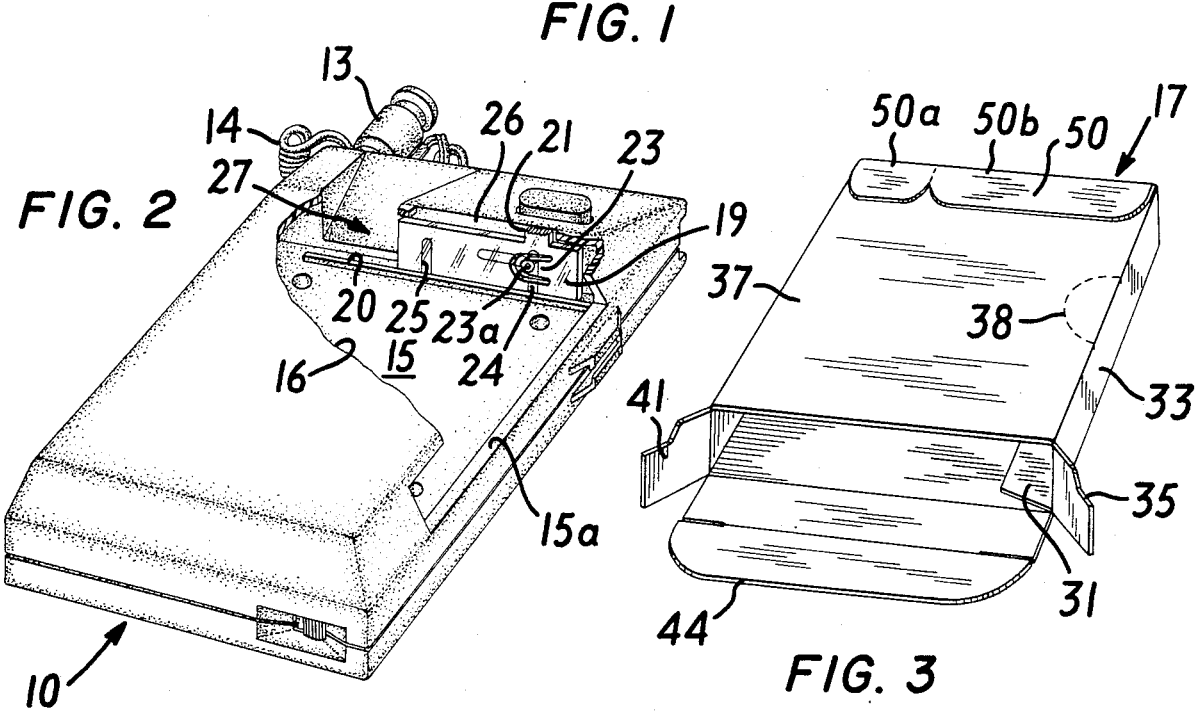
FIG. 2
FIG. 3

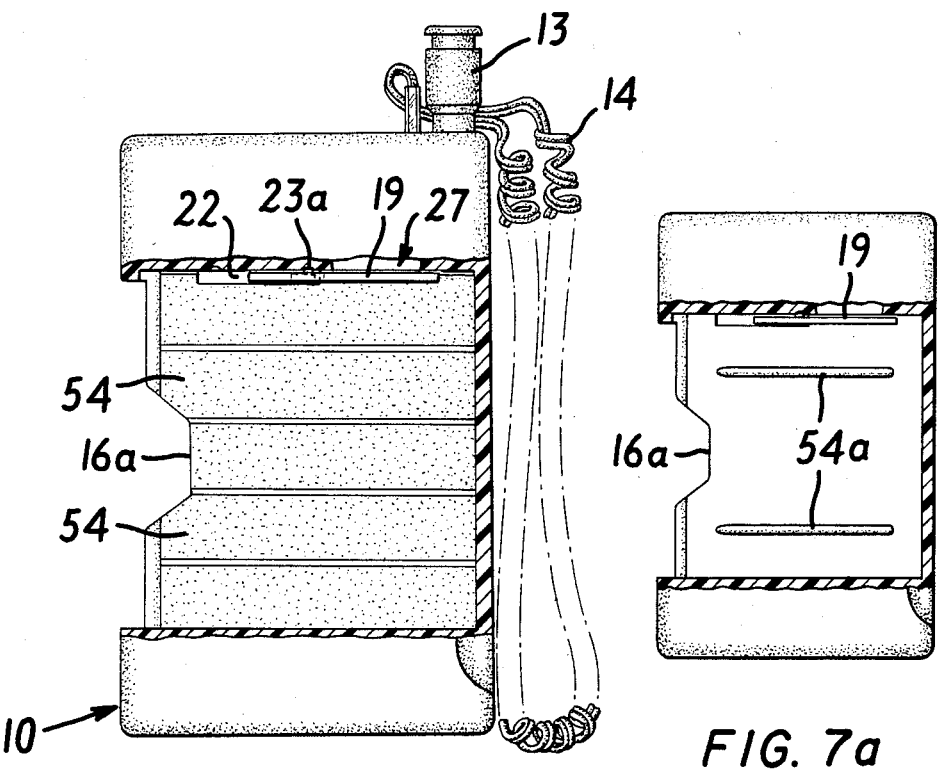
FIG. 7
FIG. 7a
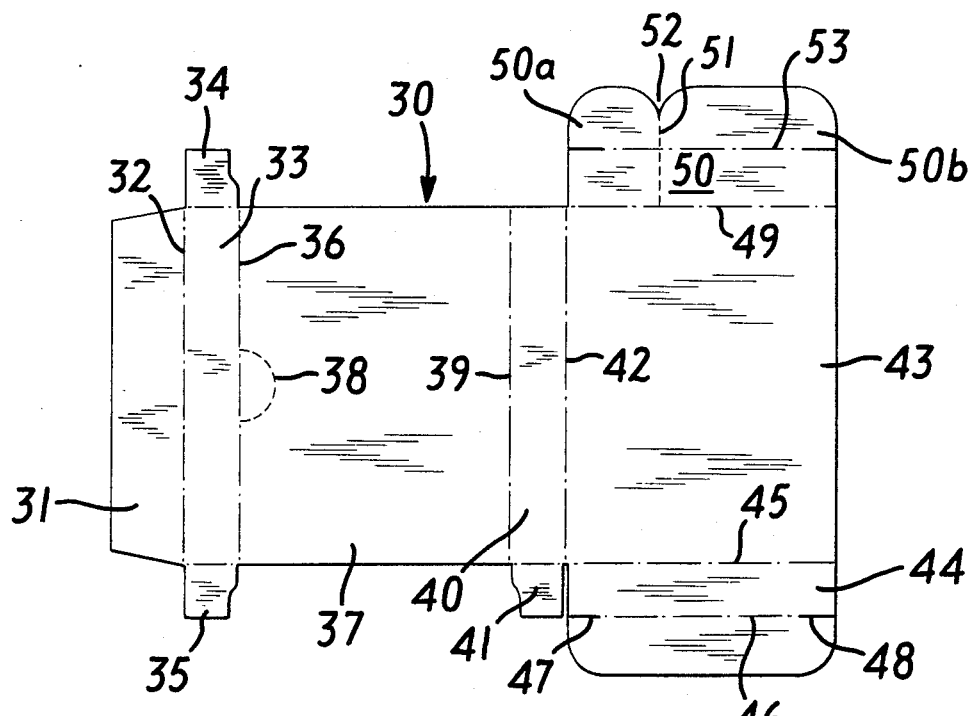
FIG. 8

PROBE COVER HOLDING AND DISPENSING ARRANGEMENT FOR ELECTRONIC THERMOMETER

BACKGROUND OF THE INVENTION

In recent years electronic thermometers, which provide rapid and accurate readings of body temperature, have supplemented mercury thermometers in hospitals and the like. Such electronic thermometers ordinarily use a probe at the end of which is located a temperature sensitive element, for example a thermister. A disposable cover is placed on the probe prior to use. After a patient's temperature is taken by insertion of the probe into a body orifice, the probe cover is removed and discarded.

Prior to use probe covers must remain clean and yet be readily accessible for installation on the thermometer probe. Probe storage arrangements used in the prior art have suffered from deficiencies in maintaining proper conditions for the probe covers as well as affording inconvenient storage for and access to the covers.

SUMMARY OF THE INVENTION

The present invention provides an improved probe cover holding and dispensing arrangement for an electronic thermometer that facilitates storage of and access to the probe covers and yet maintains the covers in a clean condition.

More particularly, an electronic thermometer housing is formed with a chamber adapted to receive a carton of probe covers. The normally sealed carton, just prior to insertion of the carton into the housing chamber, is opened by removal of a flap to expose some of the covers. The carton is then inserted into the chamber. An aperture in the chamber, normally closed by a sliding cover, provides access to the exposed covers in the carton as desired.

To retain the probe carton securely in the housing chamber, friction material is provided on at least one inner surface of the chamber. To facilitate removal of the carton after the supply of probe covers has been exhausted, a portion of the carton defined by a weakened line is adapted to be depressed by a finger, thereby enabling the user to pull the carton out of the chamber.

These and further features and advantages of the invention will be more readily understood when the following description is read in connection with the accompanying drawings.

BRIEF DESCRIPTION OF THE DRAWINGS

FIG. 1 is a view in perspective of an electronic thermometer showing a carton of probe covers about to be slipped into a compartment in the thermometer housing;

FIG. 2 is a perspective view, partially broken away, of the electronic thermometer showing a slide cover in its open position;

FIG. 3 is a view in perspective of the carton for holding the probe covers with its lower end flaps open to receive the probe covers;

FIG. 7 is a bottom plan view of the housing, partially broken away to show a surface of the chamber found in the thermometer housing carrying tape having a friction surface;

FIG. 7A is a partial bottom plan view of the housing, broken away to show a surface of the chamber carrying ribs to hold the carton; and FIG. 8 shows a plan view of the blank used to form the carton of FIG. 5.

DESCRIPTION OF EXEMPLARY EMBODIMENTS

Figure 4:
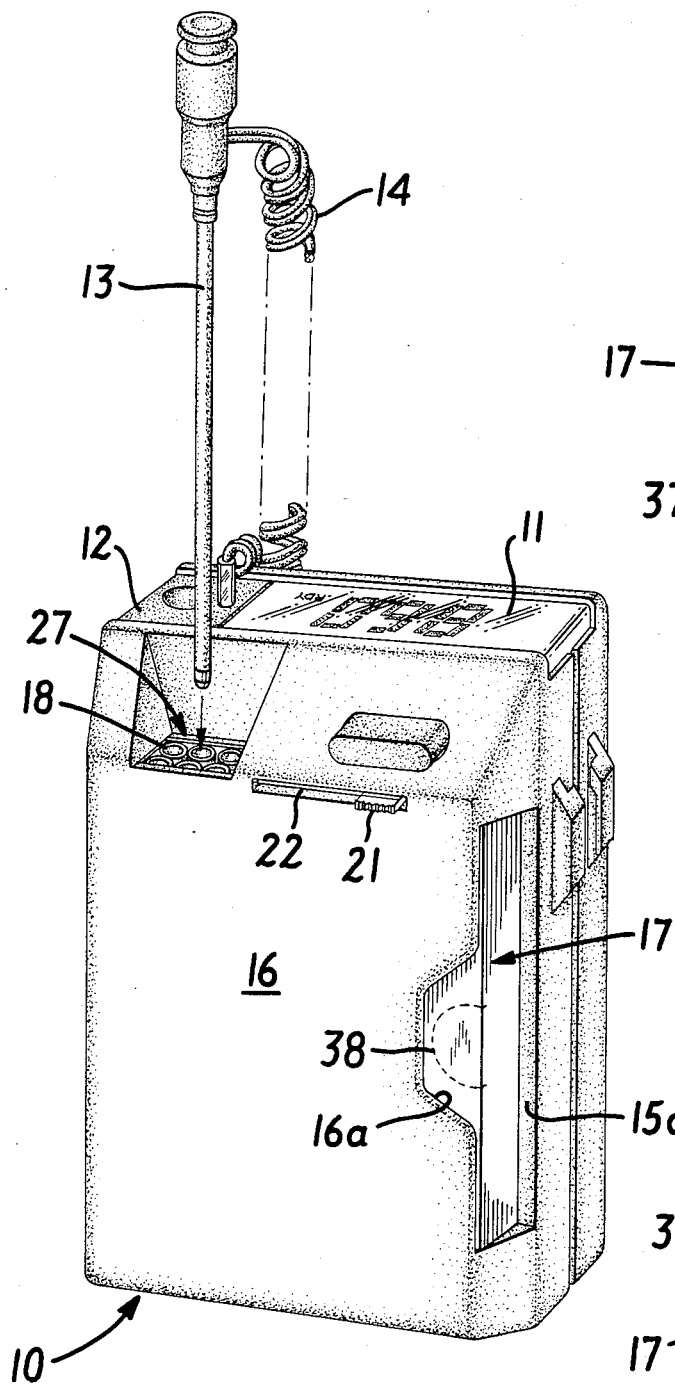
FIG. 4 is a perspective view of an electronic thermometer with the carton of probe covers in position to receive a thermometer probe.

Referring to the drawings with particular reference to FIGS. 1 and 4, a housing 10 containing the electronic thermometer is provided at its upper end with a display panel 11 to read out body temperature. An isolation chamber 12 at one side of the housing 10 receives and stores a probe 13 connected to the chamber by a cable 14. Further details of the electronic thermometer, including the isolation chamber and probe, are provided in U.S. patent application Ser. No. 681,308, filed Dec. 13, 1984, for "Electronic Thermometer with Probe Isolation Chamber," assigned to the assignee of this application.

As best shown in FIGS. 1 and 2, a probe storage chamber 15 is formed under the front wall 16 of the housing 10. The chamber 15 is open at its left-hand side to permit insertion of a carton 17 containing probe covers 18. A slightly raised rib-like portion 15a at the entrance to the chamber 15 assists in retaining the carton 17 in place, as shown in FIG. 4.

As shown in FIG. 2, a sliding cover 19, preferably translucent or transparent, is mounted in a groove 20 at the upper end of the chamber 15. A tab 21 on one side of the cover 19 protrudes through a slot 22 in the housing wall 16 to permit it to be moved along the groove 20. A resilient cut-out 23 in the cover 19 carries a small button 23a adapted to snap into recesses 24 and 25 in a wall 26 defining the upper end of the chamber 15. When the tab 21 is pushed to the left, as shown in FIG. 1, the cover 19 seals an aperture 27 leading to the chamber 15, and is held in place when the button 23a snaps into the recess 25.

The probe cover carton 17 is formed from a blank of sheet material 30, as shown in FIG. 8. The blank 30 includes an overlapping end panel 31 joined by a fold line 32 to a first side panel 33 from which extends flaps 34 and 35. A fold line 36 joins the side panel 33 to a front panel 37 provided with a portion defined by a weakened semi-circular line 38 adjacent the side panel 33. The weakened line may be produced by partially perforating or scoring the panel along the line shown.

A fold line 39 joins the front panel 37 to a second side panel 40 from one end of which extends a flap 41. A fold line 42 connects a back panel 43 to the second side panel 40. A bottom flap 44, joined to the back flap 43 by a fold line 45, is crossed by a parallel fold line 46 which terminates at end cuts 47 and 48.

A fold line 49 at the upper end of the back panel 43 joins it to a top flap 50. A weakened line 51 extends from the fold line 49 across the top flap 50 to a cut-away portion 52, thus permitting separation of the top flap 50 into a tear-away flap 50a and a flap 50b. A fold line 53 extends along the top flap 50 parallel to the fold line 49.

Figure 5:
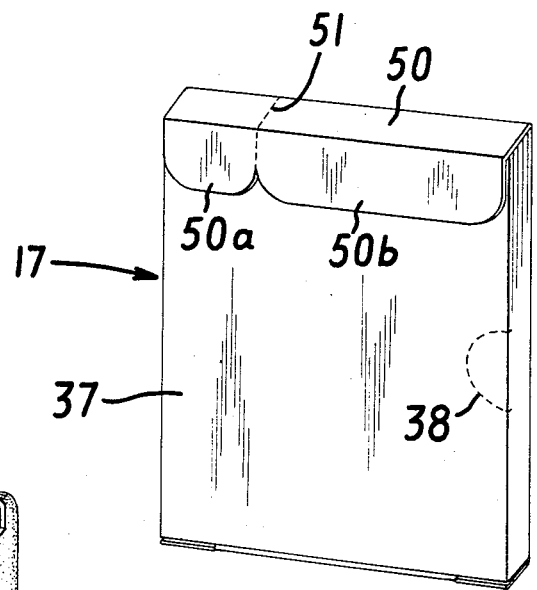
FIG. 5 is a view in perspective of the carton for holding the probe covers prior to removal of a flap providing for access to the covers.
Figure 6:
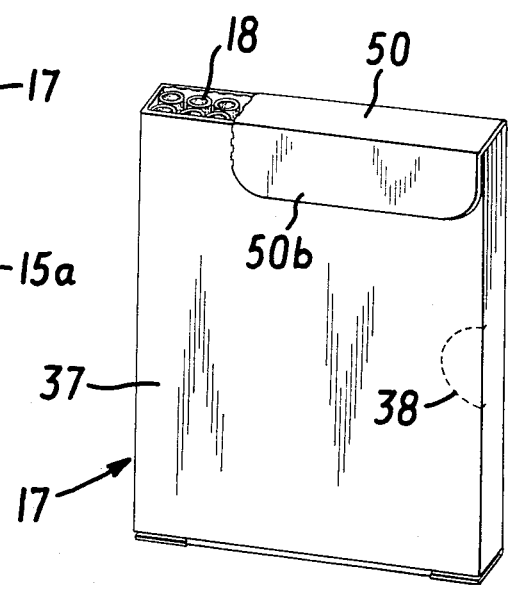
FIG. 6 is a top perspective view of the carton of FIG. 5 after removal of the flap with some of the probe covers accessible for insertion of the probe.

To assemble the carton 17, suitable adhesive is applied to the overlapping flap 31, the carton folded on the lines 32, 36, 39 and 42, and the overlapping flap affixed to the inside of the back flap 43. Suitable adhesive is then placed on the flap 50b to secure them to the front panel 37 as shown in FIG. 5. The flap 50a is torn along the weakened line 51, and torn along the fold line 49, which also may be weakened, to provide an opening for access to the probe covers 18, as shown in FIGS. 1 and 6.

The probe covers 18 are then inserted into the carton 17, the bottom flap 46 suitably tucked into the carton, and a number of cartons suitably packaged or boxed for convenient use.

When the electronic thermometer is to be used, one of the cartons 17 is selected, the flap 50a torn off to expose the covers 18, and the carton then inserted into the chamber 15, as shown in FIG. 1. Rough surface tapes 54 adhered to the underside of the housing wall 16, as shown in FIG. 7, engage and frictionally hold the carton 17 securely in position in the chamber 15. Alternatively, ribs 54a on the underside of the wall 16, as shown in FIG. 7A, engage and frictionally hold the carton.

The tab 21 is used to slide the cover 19 to the right to provide access to the probe covers 18, and the probe 13 inserted into one of the covers visible through the aperture, as shown in FIG. 4. The probe cover snaps onto the probe 13, as disclosed in the aforementioned copending application Ser. No. 681,308. The probe is then withdrawn with the probe cover 18 attached and the thermometer is ready for use. After a probe 18 is withdrawn from the carton 17, the cover 19 is closed to retain the covers 18 in position regardless of the orientation of the housing 10.

To place additional probe covers 18 in position to be used, the housing 10 need only be tilted to cause the covers to slide toward the aperture 27.

After all of the probe covers 18 in the carton 17 have been used, the portion of the front cover defined by the weakened line 38 is depressed and torn, to enable removal of the carton 17, by insertion of a finger, against the frictional resistance of the tapes 54 or ribs 54a. Note that a cut-out 16a in the wall 16 provides access to the depressible portion defined by the line 38.

While the invention has been shown and described with reference to the illustrated embodiment, it should be understood that various changes in form and details may be made without departing from the scope of the invention which is defined in the appended claims.

We claim:

1. Probe cover holding and dispensing apparatus for an electronic thermometer including a probe, comprising a chamber in the thermometer housing, a carton holding a plurality of probe covers adapted to fit into the housing chamber, an aperture in the chamber, and some of the probe covers in the carton visible through the aperture to enable the probe to be inserted into one of the covers in the carton, whereby the probe when withdrawn from the carton carries the probe cover.

2. Probe cover holding and dispensing apparatus as defined in claim 1, in which a sliding cover is provided to close the aperture in the chamber.

3. Probe cover holding and dispensing apparatus as defined in claim 1, in which friction means are provided on at least one inner surface of the chamber to retain the carton in the chamber.

4. Probe cover holding and dispensing apparatus as defined in claim 1, in which the carton is provided with a removable flap to afford access to the covers through the aperture.

5. Probe cover holding and dispensing apparatus as defined in claim 1, in which the carton is provided with a weakened line defining a portion adapted to be depressed by finger pressure to facilitate removal of the carton from the chamber.

6. Probe cover holding and dispensing apparatus for an electronic thermometer including a probe, comprising a chamber in the thermometer housing, a carton holding a plurality of probe covers adapted to fit into the housing chamber, an aperture in the chamber, a sliding cover to close the aperture, friction means on at least one inner surface of the chamber to retain the carton in the chamber, a removable flap on the carton to afford access to the covers, a weakened line on the carton defining a portion adapted to be depressed by finger pressure to facilitate removal of the carton from the chamber, and some of the probe covers in the carton exposed by removal of the removable flap, the probe covers being visible through the aperture to enable the probe to be inserted into one of the covers in the carton, whereby the probe when withdrawn from the carton carries the probe cover.

* * * * *